United States Patent [19]

Abe et al.

[11] Patent Number: 5,218,048
[45] Date of Patent: Jun. 8, 1993

[54] POLYOLEFIN RESIN COMPOSITION

[75] Inventors: Hiroomi Abe, Chiba; Kenji Nagaoka; Takashi Sanada, both of Ichihara, all of Japan

[73] Assignee: Sumitomo Chemical Company, Limited, Osaka, Japan

[21] Appl. No.: 624,563

[22] Filed: Dec. 10, 1990

[30] Foreign Application Priority Data

Dec. 11, 1989 [JP] Japan .................. 1-321149

[51] Int. Cl.$^5$ .............................. C08L 53/00
[52] U.S. Cl. ........................... 525/92; 525/57; 525/64; 525/66; 525/67; 525/68; 525/84; 525/95; 525/96; 525/98; 525/133; 525/146; 525/189; 525/282; 525/285; 525/296; 525/301
[58] Field of Search ............. 525/57, 64, 66, 67, 525/68, 84, 95, 96, 98, 282, 285, 296, 301, 189, 92, 133, 146

[56] References Cited

U.S. PATENT DOCUMENTS

| | | | |
|---|---|---|---|
| 4,009,228 | 2/1977 | Tazuma et al. | 525/136 |
| 4,130,213 | 12/1978 | Wszolek | 525/120 |
| 4,628,072 | 12/1986 | Shiraki et al. | 525/57 |
| 4,657,970 | 4/1987 | Shiraki et al. | 525/57 |
| 4,657,971 | 4/1987 | Shiraki et al. | 525/57 |
| 4,740,536 | 4/1988 | Chao | 523/406 |
| 4,820,768 | 4/1989 | Shiraki et al. | 525/92 |
| 4,927,889 | 5/1990 | Shiraki | 525/285 |
| 4,972,020 | 11/1990 | Shiraki et al. | 525/90 |

*Primary Examiner*—John Kight, III
*Assistant Examiner*—Shelley Dodson
*Attorney, Agent, or Firm*—Stevens, Davis, Miller & Mosher

[57] ABSTRACT

A resin composition comprising (A) a thermoplastic resin, (B) a functional compound having one or more bonds or one or more functional groups selected from the group consisting of organic groups having a non-aromatic carbon-carbon multiple bonds, oxirane groups and substituted carboxyl groups and (C) a diamino compound represented by the following general formula:

$$R^I NH-X-NHR^{II}$$

wherein $R^I$ and $R^{II}$ each represents a hydrogen atom or an alkyl group optionally having one or more inactive substituents, and X represents an alkylene group having 7 to 30 carbon atoms and optionally having one or more inactive substituents.

17 Claims, No Drawings

POLYOLEFIN RESIN COMPOSITION

BACKGROUND OF THE INVENTION

1. Field of the Invention

This invention relates to a resin composition, and more particularly to a polyolefin resin type resin composition enhanced in impact resistance while retaining its characteristic properties such as stiffness, etc.

2. Description of the Prior Art

Polyolefin resins and particularly crystalline polyolefin resins are characterized by low density and inexpensiveness in addition to their excellent properties such as stiffness, electrical properties, solvent resistance, moldability, processability, etc. and therefore extensively used practically in the form of various molded articles and films.

However, such polyolefin resins still have some faults, and their improvement in these points is waited for. One of the faults is inferiority in impact resistance. A variety of proposals have hitherto been made for the purpose of overcoming this fault. Such proposed methods include, for example, a method of blending an elastomer into a polyolefin resin, a method of forming a random or block copolymer having an elastomeric constituent made of plural olefin monomer units in a polyolefin resin by polymerization with the aim of improvement (Japanese Patent Application Kokai (Laid-Open) No. 63-30950), etc.

On the other hand, there have been made various attempts to blend a polyolefin resin with other thermoplastic resin for the purpose of producing a material improved in heat resistance of which inferiority is another fault of Polyolefin resin, while retaining the above-mentioned excellent characteristic properties of polyolefin resin such as moldability, etc. Thus, a resin composition comprising a polyolefin resin and a polyphenylene ether resin [Japanese Patent Application Kokoku (Post-Exam.) No. 42-7069, Japanese Patent Application Kokai (Laid-Open) No. 2-115248, etc.], a resin composition comprising a polyolefin resin and a polyphenylene sulfide (Japanese Patent No. 1,005,081), a resin composition comprising polystyrene and polypropylene (U.S. Pat. No. 4,237,190), etc. have already been proposed.

However, these methods and compositions having been proposed up to today all have some faults and cannot be satisfactory from the industrial point of view. That is, in the above-mentioned methods for improving impact property of polyolefin resin by blending an elastomer into it or modifying a polyolefin resin by polymerization, a practically improved impact property can be acquired only when a considerably large quantity of elastomer is made to exist in the polyolefin resin, as the result of which the original excellent properties inherent in polyolefin resins such as stiffness, heat distortion resistance, etc. are inevitably deteriorated.

In composition comprising a polyolefin resin and other thermoplastic resin, a resin composition excellent in compatibility is generally difficult to obtain because of the low affinity between polyolefin resin and other thermoplastic resin, and it is yet impossible to obtain at the present state to prepare a resin composition comprising a polyolefin resin and other thermoplastic resin having so excellent properties as to be fit for practical uses, in spite of the many proposals. There have been made various proposals regarding improvement of compatibility in the compositions comprising a polyolefin resin and other thermoplastic resin. For example, regarding the compositions comprising a polyolefin resin and a polyphenylene ether resin, a resin composition comprising an acid-modified polyolefin resin and a polyphenylene ether resin (Japanese Patent Application Kokai (Laid-Open) No. 60-120748), a resin composition comprising a modified polyolefin resin, a modified polyphenylene ether resin and a binder (Japanese Patent Application Kokai (Laid Open) No. 63-128056, a resin composition prepared by compounding an amino group-containing modified polyolefin resin, a polar group-containing modified polyphenylene ether resin, a polyolefin resin, a polyphenylene ether resin, etc. (Japanese Patent Application Kokai (Ladi-Open) No. 2-173137), etc. have been proposed. However, these proposed resin compositions are insufficient in compatibility and unsatisfactory in mechanical properties and particularly in impact resistance and tensile elongation, though they are improved in solvent resistance, moldability, etc.

Regarding the improvement of a resin composition comprising a polyolefin resin and a polyarylene sulfide resin, a resin composition comprising an olefin copolymer and polyphenylene sulfide (Japanese Patent Application Kokai (Laid-Open) No. 58-154757), a resin composition comprising a modified polyolefin resin, polyphenylene sulfide and an epoxy resin [Japanese Patent Application Kokai (Laid-Open) No. 59-207921], etc. have been proposed. Further, regarding the improvement of a resin composition comprising a polyolefin resin and a polystyrene type resin, a resin composition containing a hydrogenated block copolymer as a third ingredient [Japanese Patent Application Kokoku (Post-Exam.) No. 62-34782 and Japanese Patent Application Kokai (Laid-Open) No. 1-174550], etc. have been proposed. However, these Proposed resin compositions are yet insufficient in impact resistance.

SUMMARY OF THE INVENTION

It is an object of this invention to provide a polyolefin resin composition containing a polyolefin resin as a resin ingredient and having a high stiffness and an excellent impact property simultaneously. It is another object of this invention to provide a resin composition comprising a polyolefin resin and other thermoplastic resin and having excellent mechanical properties, particularly impact resistance and tensile elongation.

With the aim of achieving the objects mentioned above, the present inventors conducted many studies to find a surprising fact that, when the two kinds of specified organic compounds are mixed into a polyolefin resin, impact strength of the polyolefin resin can be improved to a remarkable extent without deteriorating the excellent properties which the polyolefin resin originally has, such as high stiffness, etc. and that, when two kinds of specified organic compounds are similarly mixed into a mixture consisting of a polyolefin resin and other thermoplastic resin, there can be obtained a resin composition remarkably higher in compatibility than in the above-mentioned case disclosed in Japanese Patent Application Kokai (Laid-Open) No. 63-128056 where a binder was mixed. Based on these findings, this invention was accomplished.

Thus, this invention provides a resin composition comprising (A) a thermoplastic resin, (B) a functional compound having one or more bonds or one or more functional groups selected from the group consisting of non-aromatic carbon-carbon multiple bonds, oxirane groups and substituted carboxyl groups, and (C) a diamino compound represented by the following general formula:

$$R^I NH-X-NHR^{II}$$

wherein $R^I$ and $R^{II}$ each represents a hydrogen atom or an alkyl group optionally having one or more inactive substituents, and X represents an alkylene group having 7 to 30 carbon atoms and optionally having one or more inactive substituents.

DETAILED DESCRIPTION OF THE INVENTION

The term "thermoplastic resin (A)" used in this invention means a resin or a resin mixture comprising an polyolefin resin and optionally other thermoplastic resin and optionally an elastomer.

As the polyolefin resin used in this invention as thermoplastic resin (A) or as a part of thermoplastic resin (A), homopolymers and copolymers of olefins such as α-olefins exemplified by ethylene, propylene, butene-1, pentene-1, hexene-1, 3-methylbutene-1, 4-methylpentene-1, octene-1, decene-1, dodecene-1, tetradecene-1, hexadecene-1, octadecene-1, eicosene-1 and the like, cyclic olefins mentioned in Japanese Patent Application Kokai (Laid-Open) No. 2-115248, etc. can be referred to. Copolymers prepared by copolymerizing the olefins with a small quantity of other unsaturated monomers, modified products of said copolymers and modified products of homopolymers or copolymers of said olefins prepared by oxidation, halogenation, sulfonation, etc. are also included in the polyolefin resin of this invention.

Examples of the above mentioned unsaturated monomer copolymerizable with an olefin include unsaturated organic acids and their derivatives such as acrylic acid, methacrylic acid, maleic acid, itaconic acid, methyl acrylate, methyl methacrylate, maleic anhydride, arylmaleic acid imide, alkylmaleic acid imide and the like; vinyl esters such as vinyl acetate, vinyl butyrate and the like; aromatic vinyl compounds such as styrene, methylstyrene and the like; vinylsilanes such as vinyltrimethylmethoxysilane, γ-methacryloyloxypropyltrimethoxysilane and the like; non-conjugated dienes such as dicyclopentadiene, 4-ethylidene-2-norbornene, 4-methyl-1,4-hexadiene, 5-methyl-1,4-hexadiene and the like; etc. Among the polyolefins mentioned above, copolymers containing 50% by weight or more of ethylene, propylene, butene-1, 3-methylbutene-1 or 4-methylpentene-1, and homopolymers of these monomers are preferable, and crystalline propylene type polymers such as propylene homopolymer, propylene-ethylene block or random copolymer and the like are more preferable.

Although molecular weight range of the polyolefin resin cannot be simply specified because desirable molecular weight varies with the purpose, the molecular weight is usually in the range of 0.01 to 400 g/10 minutes and preferably 0.15 to 60 g/10 minutes, as expressed in terms of melt flow rate (MFR) measured at a temperature of 230° C. under a load of 2.16 kg/cm².

The above-mentioned polyolefin resin can be produced by hitherto known methods such as polymerization or modification. Commercial products are also extensively available, and they can also be used after an appropriate selection.

The thermoplastic resin (A) can comprise other thermoplastic resin in addition to the polyolefin resin, if desired. Examples of said other thermoplastic resin include polyphenylene ether resin, polyarylene sulfide resin, polysulfone resin, polyketone resin, polyester resin, polystyrene resin, polycarbonate resin and the like.

As used herein, the term "polyphenylene ether resin" means a polymer constituted of a recurring unit represented by the following general formula:

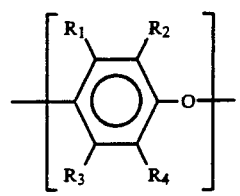

wherein $R_1$, $R_2$, $R_3$ and $R_4$ each represents identical or different group selected from the group consisting of hydrogen atom, halogen atom, hydrocarbon group, substituted hydrocarbon group, hydrocarbon-oxy group and substituted hydrocarbon-oxy group. Examples of the substituent in the substituted hydrocarbon group and substituted hydrocarbon-oxy group include thermally stable groups such as halogen atom, hydroxyl group, amino group, nitro group, cyano group, ester group, amido group, ether group, carboxyl group, sulfide group, sulfone group and the like.

Concrete examples of said polyphenylene ether resin include poly(2,6-dimethyl-1,4 phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropenyl-1,4-phenylene ether), poly(2-ethyl-6-propyl-1,4-phenylene ether), poly(2,6-dibutyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether), and various copolymers having plural kinds of recurring units constituting these polymers. The copolymers also include copolymers formed between poly-substituted phenols such as 2,3,6-trimethylphenol, 2,3,5,6-tetramethylphenol and the like and 2,6-dimethylphenol, and the like. The "polyphenylene ether resin" referred to in this invention also includes graft-modified products of polyphenylene ether resin prepared by graft-modifying the above-mentioned polyphenylene ether resins with a styrene type monomer such as styrene, α-methylstyrene and the like. Among these polyphenylene ether resins, poly(2,6-dimethyl-1,4-phenylene ether) and 2,6-dimethylphenol/2,3,6-trimethylphenol copolymer are preferable.

Although molecular weight of the polyphenylene ether resin usable in this invention cannot be simply specified because desirable molecular weight varies depending on the purpose, it is usually 0.1 to 0.7 dl/g and preferably 0.2 to 0.6 dl/g, as expressed in terms of intrinsic viscosity measured in chloroform at 30° C.

The process for producing such polyphenylene ether resins is well known and mentioned in, for example, U.S. Pat. Nos. 3,306,874, 3,306,875 and 3,257,357, Japanese Patent Application Kokoku (Post-Exam.) No. 52-17880, Japanese Patent Application Kokai (Laid-Open) Nos. 50-51197 and 1-304119, etc.

The term "polyarylene sulfide resin" used in this invention means a polymer constituted of a recurring unit represented by the following general formula:

wherein Ar represents a divalent aromatic residue of which examples include:

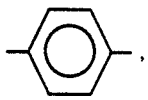

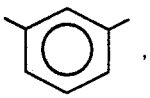

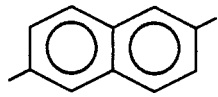

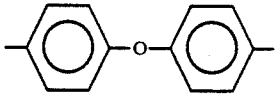

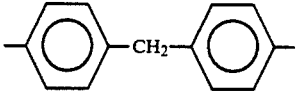

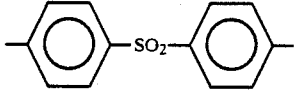

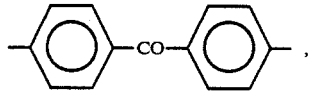

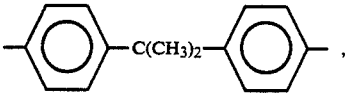

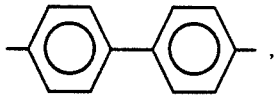

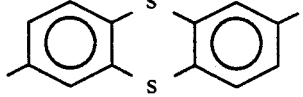

and the like and their substituted derivatives.

Concrete examples of said polyarylene sulfide resin include straight chain type and crosslinked chain type polyphenylene sulfide, poly(1,4-phenylenecarbonyl-1,4-phenylene sulfide), poly(1,4-phenylenesulfonyl-1,4-phenylene sulfide), poly(biphenylene sulfide) and the like. Among them, polyarylene sulfides containing 50% by mole or more of

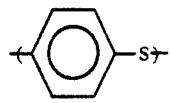

unit are preferable, and polyphenylene sulfide is more preferable.

Although molecular weight of the polyarylene sulfide resin is not critical, it is usually 100 to 50,000 poises and preferably 200 to 10,000 poises, as expressed in terms of melt viscosity at 300° C.

The process for producing said polyarylene sulfide resin is well known, and its examples include processes of reacting a dihalogenated aromatic compound with alkali sulfide in an organic polar solvent [U.S. Pat. No. 2,513,188, Japanese Patent Application Kokoku (Post-Exam.) No. 44-27671, Japanese Patent Application Kokai (Laid-Open) No. 55-43139, etc.], and the like.

The term "polystyrene type resin" used in this invention means a thermoplastic resin comprising a polymer of an alkenylaromatic hydrocarbon such as styrene, α-methylstyrene vinyltoluene and the like as its main constituent, and its concrete examples include polystyrene, acrylonitrile-butadiene-styrene (ABS) resin, acrylonitrile-styrene (AS) resin, methylmethacrylates-tyrene (MS) resin and the like.

The term "polysulfone resin" used in this invention means an aromatic polymer having group —$SO_2$— in its molecular skeleton such as polymers mentioned in J. Polym. Sci., Part A-1, Vol. 5, 2375 (1967), and its concrete examples include poly(oxy-1,4-phenylene-2,2-propylidene-1,4-phenyleneoxy-1,4-phenylenesulfonyl-1,4-phenylene), poly(oxy-1,4-phenylenesulfonyl-1,4-phenylene) and the like.

The term "polyketone resin" used in this invention means an aromatic polymer having group —CO— in its main chain, such as polymers mentioned in JMS-Rev. Macromol. Chem. Phy., C27(2), 313 (1987), and its concrete examples include poly(oxy-1,4-phenylenecarbonyl-1,4-phenylene), poly(oxy-1,4-phenyleneoxy-1,4-phenylenecarbonyl-1,4-phenylene) and the like.

The term "polycarbonate resin" used in this invention means an aromatic polymer having group —O—CO—O— in its main chain produced by a condensation reaction between a divalent phenol and phosgen or diphenyl carbonate, and its typical example is poly(oxy-1,4-phenylene-2,2-propylidene-1,4-phenyleneoxycarbonyl).

The term "polyester resin" used in this invention means a polymer having group —O—CO— in its main chain produced by a condensation reaction of a dicarboxylic acid derivative and a dihydric alcohol or a dihydric phenol or by a self-condensation reaction of an oxycarboxylic acid, and its concrete examples include polyethylene terephthalate, polybutylene terephthalate, polyethylene naphthalate, polyarylate and the like.

Among these "other thermoplastic resins", polyphenylene ether resins, polyarylene sulfide resins and polystyrene type resins are preferable.

The term "functional compound (B)" used in this invention means an organic compound having one or more bonds or one or more functional groups selected from the group consisting of non-aromatic carbon-carbon double or triple bonds, oxirane group and substituted carboxyl groups.

In this invention, the functional compound having only non-aromatic carbon-carbon double or triple bonds includes the following olefins, liquid diene polymers and quinones.

That is, concrete examples of such a functional compound include olefins such as dodecene-1, octadecene-1 and the like; liquid diene polymers such as liquid polybutadiene; and quinones such as 1,2-benzoquinone, 1,4-benzoquinone, 2,6-dimethylbenzoquinone, 2,6-diphenylbenzoquinone, tetramethylbenzoquinone, 2-chloro-1,4-benzoquinone, chloranil, 2,2'-diphenoquinone, 4,4'-diphenoquinone, 1,2-naphthoquinone, 1,4-naphthoquinone, 2,6-naphthoquinone, 9,10-anthraquinone and the like.

In this invention, concrete examples of the functional compound having only one or more oxirane groups include epoxy resins produced by a condensation reaction of epichlorohydrin and a compound selected from the group consisting of polyhydric phenols, polyhydric alcohols and amines; epoxides of the above-mentioned liquid diene polymers; and epoxy compounds exemplified by oxidized polyolefin wax, octadecyl glycidyl ether, 1-hexadecene oxide and the like.

In this invention, examples of the functional compound having only one or more substituted carboxyl groups include the compounds mentioned below. As used herein, the term "substituted carboxyl group" means groups represented by the following formulas which are derived from a carboxyl group:

—COOR$_1$

—COX

—CONR$_2$R$_3$

—CO—Y—CO— wherein R$_1$ represents hydrogen atom or an alkyl or aryl group having 1–20 carbon atoms optionally having one or more inactive substituents, X represents halogen atom, R$_2$ and R$_3$ each represents hydrogen atom or an alkyl or aryl group having 1–10 carbon atoms optionally having one or more inactive substituents, and Y represents oxygen atom or NH.

Concrete examples of such functional compounds include carboxylic acid derivatives exemplified by succinic anhydride, maleic anhydride polymers such as polymaleic anhydride, styrene-maleic anhydride copolymer and the like, methyl p-nitrobenzoate, p-cyanophenylacetamide and the like.

As the functional compound (B) used in this invention, functional compounds simultaneously having (i) at least one bond or functional group selected from the group consisting of non-aromatic carbon-carbon multiple bonds, oxirane groups and substituted carboxyl groups and (ii) at least one functional group selected from the group consisting of substituted carboxyl groups, substituted hydroxyl groups, substituted amino groups, substituted silyl groups, substituted mercapto groups, substituted sulfonic acid groups and oxirane groups, provided that the functional group of (ii) differs from the functional group of (i), are preferred.

As used herein, the term "substituted hydroxyl group" means groups represented by the following general formulas which are derived from a hydroxyl group:

—OR$_4$

—OCR$_5$

—OSi(R$_6$)$_3$ wherein R$_4$ and R$_5$ each represents hydrogen atom or an alkyl or aryl group having 1–10 carbon atoms optionally having one or more inactive substituents, and three R$_6$s each represents identical or different alkyl, aryl or alkoxy group having 1–10 carbon atoms optionally having one or more inactive substituents.

The term "substituted amino group" means groups represented by the following general formulas which are all derived from an amino group:

—NHR$_7$

—NHCR$_8$ wherein R$_7$ represents hydrogen atom, cyano group or an alkyl or aryl group having 1–10 carbon atoms optionally having one or more inactive substituents, and R$_8$ represents hydrogen atom or an alkyl or aryl group having 1–20 carbon atoms optionally having one or more inactive substituents.

The term "substituted silyl group" means groups represented by the following general formula which are derived from a silyl group:

—Si(R$_9$)$_3$ wherein three R$_9$s each represents hydrogen atom or identical or different alkyl, aryl or alkoxy group having 1–10 carbon atoms optionally having one or more amino groups or mercapto groups.

The term "substituted mercapto group" means groups represented by the following general formulas which are derived from a mercapto group:

—SR$_{10}$

—SCR$_{11}$ wherein R$_{10}$ and R$_{11}$ each represents hydrogen atom or an alkyl or aryl group having 1–10 carbon atoms optionally having one or more inactive substituents.

The term "substituted sulfonic acid group" means groups represented by the following general formulas which are all derived from a sulfonic acid group:

—SO$_3$R$_{12}$

—SO$_2$X

—$SO_2NR_{13}R_{14}$ wherein $R_{12}$ represents hydrogen atom or an alkyl or aryl group having 1-20 carbon atoms optionally having one or more inactive substituents, X represents a halogen atom, and $R_{13}$ and $R_{14}$ each represent hydrogen atom or an alkyl or aryl group having 1-10 carbon atoms optionally having one or more inactive substituents.

Preferred examples of such functional compounds include unsaturated dicarboxylic acids exemplified by maleic acid, fumaric acid, chloromaleic acid, Hymic acid, citraconic acid, itaconic acid and the like; unsaturated monocarboxylic acids exemplified by acrylic acid, butenoic acid, crotonic acid, vinylacetic acid, methacrylic acid, pentenoic acid, dodecenoic acid, linoleic acid, angelic acid, cinnamic acid and the like; acid anhydrides of the above-mentioned unsaturated dicarboxylic acids and unsaturated monocarboxylic acids exemplified by maleic anhydride, Hymic anhydride, acrylic anhydride and the like; acid amides of the above-mentioned unsaturated dicarboxylic acids and unsaturated monocarboxylic acids exemplified by maleic acid amide, maleic acid hydrazide, acrylamide, N-hydroxymethyl acrylamide and the like; esters of the above-mentioned unsaturated dicarboxylic acids and unsaturated monocarboxylic acids exemplified by ethyl maleate and the like; imides of the above-mentioned unsaturated dicarboxylic acids and unsaturated monocarboxylic acids exemplified by maleimide and the like; unsaturated epoxy compounds exemplified by allyl glycidyl ether, glycidyl acrylate, glycidyl methacrylate and the like; unsaturated amines exemplified by allylamine, p-aminostyrene, N-vinylaniline and the like; unsaturated alcohols exemplified by allyl alcohol, 3-buten-2-ol, propargyl alcohol and the like; alkenylphenols exemplified by p-vinylphenol, 2-propenylphenol and the like; organosilane compounds exemplified by 2-(3-cyclohexenyl)-ethyltrimethoxysilane, 1,3-divinyltetraethoxysilane, vinyltris(2-methoxyethoxy)-silane, 5-(bicycloheptenyl)-triethoxysilane, γ-aminopropyltriethoxysilane, γ-mercaptopropyltrimethoxysilane and the like; mercapto compounds such as 3-mercaptopropionic acid, 2-mercaptobenzimidazole and the like; oxycarboxylic acid derivatives such as DL-tartaric acid, 2-hydroxyisobutyric acid, citric acid, malic acid, agaricic acid, calcium citrate, calcium malate, potassium citrate, ammonium citrate dibasic, ammonium citrate tribasic, Potassium malate, acetyl citrate, stearyl citrate, distearyl citrate, acetyl maleate, stearyl maleate, N,N'-diethylcitric acid amide, N,N'-dipropylcitric acid amide, N-phenylcitric acid amide, N-dodecylcitric acid amide, N,N'-didodecylcitric acid amide, N-dodecylmalic acid amide and the like; carboxylic acid halides such as trimellitic anhydride acid halide, chloroformylsuccinic acid, chloroformylsuccinic anhydride, chloroformylglutaric acid, chloroformylglutaric anhydride, chloroacetylsuccinic anhydride and the like.

More preferable functional compounds are compounds simultaneosuly having (i) one or more non-aromatic carbon-carbon multiple bonds and (ii) at least one functional group selected from the group consisting of the above-mentioned substituted carboxyl groups, substituted hydroxyl groups, substituted amino groups, substituted silyl groups, substituted mercapto groups and oxirane groups, and the above-mentioned oxycarboxylic acid derivatives. Among them, more preferable functional compounds are maleic acid, fumaric acid, acrylic acid, methacrylic acid, maleic anhydride, Hymic anhydride, glycidyl methacrylate, glycidyl acrylate, acrylamide, maleimide, allylamine, allyl alcohol, propargyl alcohol, citric acid and malic acid; and the most preferable functional compounds are maleic anhydride, Hymic anhydride, malic acid, citric acid and fumaric acid.

In this invention, the functional compounds (B) give a more successful result in some cases when used in combination with an alkenyl-aromatic hydrocarbon such as styrene, α-methylstyrene and the like.

As used in this invention, the term "diamino compound (C)" means an organic compound represented by the following general formula:

$R^INH—X—NHR^{II}$ wherein $R_I$ and $R^{II}$ each represents hydrogen atom or an alkyl group optionally having one or more inactive substituents and X represents an alkylene group having 7 to 30 carbon atoms and optionally having one or more inactive substituents. Herein, the inactive substituent in $R^I$, $R^{II}$ and X is a thermally stable group such as aryl group, halogen atom, cyano group, nitro group, carbonyl group, sulfonyl group, ether group, sulfide group, ester group, amido group and the like.

Concrete examples of such diamino compound (C) include 1,6-diamino-2-ethylhexane, 1,7-diaminoheptane, 1,8-diaminooctane, 1,9-diaminononane, 1,10-diaminodecane, 1,11-diaminoundecane, 1,12-diaminododecane, 1,12-bis-(N,N'-dimethylamino)dodecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,24-diaminotetracosane, 1,6-diamino-2,2-dimethyl-4-methylhexane, bis(4-aminocyclohexyl)-methane, bis(4-amino-3-methylcyclohexyl)-methane, 2,2'-bis(4-aminocyclohexyl)-propane, bis-hexamethylenetriamine and the like.

Among these compounds, diamino compounds wherein $R^I$ and $R^{II}$ both represent a hydrogen atom and X represents a straight chain alkylene group having 8 to 20 carbon atoms are preferable, and 1,12-diaminododecane is most preferable.

When a resin composition having a more enhanced impact strength is required in this invention, it is desirable to incorporate an elastomer into the composition.

Examples of said elastomer include natural rubber, polybutadiene rubber, polyisoprene rubber, butyl rubber, ethylene-propylene copolymer rubber, butadienestyrene copolymer rubber, butadiene-acrylonitrile copolymer rubber, hydrogenated and non-hydrogenated styrene-conjugated diene block copolymer rubber, polyester rubber, acrylic rubber, silicone rubber, their modified products and the like.

Among them, preferable elastomers are dienecopolymerized terpolymers, ethylene-propylene copolymer rubbers containing a graft copolymer prepared by graft copolymerizing an unsaturated monomer such as styrene and the like, and styrene-conjugated diene block copolymer rubbers such as styrene-isoprene diblock copolymer, styrene-butadiene triblock copolymer and the like including hydrogenated products thereof such as partially hydrogenated products thereof.

In the resin composition of this invention, thermoplastic resin (A) comprises the above-mentioned polyolefin resin, together with the above-mentioned "other thermoplastic resin" as an optional ingredient and the above-mentioned elastomer as an optional ingredient. Said polyolefin resin, other thermoplastic resin and elastomer may be a combination of plural species.

When an "other thermoplastic resin" is used, proportion of other thermoplastic resin in the thermoplastic resin (A) is usually 0 to 99% by weight and preferably 5 to 95% by weight, based on the weight of thermoplastic resin (A).

When an elastomer is used, proportion of the elastomer which can be contained in the thermoplastic resin (A) is 0 to 70% by weight and preferably 1 to 50% by weight, based on the weight of thermoplastic resin (A) including the elastomer.

In the resin composition of this invention, the effects brought about by the functional compound (B) and diamino compound (C) vary not only depending on the kinds of themselves but also depending on the selected composition and formulation of thermoplastic resin (A). Accordingly, preferable ranges of the quantities of functional compound (B) and diamino compound (C) cannot be specified simply. However, per 100 parts by weight of thermoplastic resin (A), the quantity of functional compound (B) is usually 0.1 to 30 parts by weight and preferably 0.2 to 20 parts by weight, and the quantity of diamino compound (C) is usually 0.001 to 20 parts by weight and preferably 0.02 to 10 parts by weight.

The resin composition of this invention can be produced by conventional methods used in the compounding process of thermoplastic resins, such as the method mentioned in Japanese Patent Application Kokai (Laid-Open) No. 63-128056. As for the order of mixing of ingredients, various orders can be adopted.

For example, (1) a simultaneous mixing of all the ingredient, (2) a previous mixing of thermoplastic resin (A) and functional compound (B), and (3) a previous mixing of the polyolefin resin and one or both of other thermoplastic resin and elastomer in the thermoplastic resin (A) with a functional compound (B) for obtaining a modified product, followed by mixing the resulting modified product with the remaining ingredients, etc. can be adopted.

As the process for producing a resin composition of this invention, the above-mentioned case (2) is desirable. More concretely speaking, the resin composition of this invention can be produced by melting and kneading thermoplastic resin (A) comprising the above-mentioned polyolefin resin and optionally the above-mentioned other thermoplastic resin and optionally the above-mentioned elastomer together with the above-mentioned functional compound (B), and thereafter mixing thereinto the above-mentioned diamino compound (C) and optionally the above-mentioned elastomer and optionally other substances mentioned later. Herein, as the method for the melting and kneading, various hitherto known methods can be adopted. For example, the above-mentioned ingredients are mixed together by means of known mixing means conventionally used for mixing together a resin and another resin or a resin and a liquid or solid additive, such as Henschel mixer, Supermixer, ribbon blender, V blender and the like to prepare a uniform mixture, after which the mixture is kneaded by the use of a kneading means such as Banbury mixer, Plastomill, Brabender Plastograph, single or twin screw extruder or the like.

Temperature of the kneading is selected from a range of 150° to 400° C. and preferably 200° to 350° C. It is sometimes preferable to carry out the kneading in the presence of a radical generator, in order to obtain a more uniform resin composition.

Examples of said radical generator include halogenated imides such as N-bromosuccinimide and the like; organic peroxides such as benzoyl peroxide, dicumyl peroxide, di-t-butyl peroxide, cumene hydroperoxide, 2,5-dimethyl-2,5-di(peroxybenzoate)-hexine-3, 1,3-bis-(t-butylperoxyisopropyl)-benzene, lauroyl peroxide, t-butyl peracetate and the like; persulfates such as potassium persulfate, ammonium persulfate and the like; diazo compounds such as azobisisobutyronitrile, 1,1'-azobis(cyclohexanecarbonitrile) and the like.

When such a radical generator is used, its amount is usually 10 parts by weight or less and preferably 0.001 to 5 parts by weight, per 100 parts by weight of thermoplastic resin (A).

In producing the resin composition of this invention, it is preferable that the diamino compound (C) be mixed after the thermoplastic resin (A) and functional compound (B) have formed at least apparently uniform molten mixture. Although the method of mixing at this time is not critical, the above-mentioned melting and kneading methods are preferable.

As preferable concrete embodiments of the production of the resin composition of this invention, the followings can be referred to. Thus, according to Embodiment (1), a thermoplastic resin (A), a functional compound (B), optionally an elastomer and optionally a radical generator are melted and kneaded by the use of a twin screw extruder to produce a formed product such as pellet. After once isolating the formed product, it is compounded with a diamino compound (C) and optionally an elastomer and optionally other substances mentioned later, and the resulting mixture is melted and kneaded by the use of a twin screw extruder. According to Embodiment (2), an extruder equipped with an upstream feeder and a downstream feeder is used. From the upstream feeder, a thermoplastic resin (A), a functional compound (B), optionally an elastomer and optionally a radical generator are continuously fed at a predetermined rate. From the downstream feeder, a diamino compound (C), optionally an elastomer and optionally other substances mentioned later are continuously fed at a predetermined rate. While feeding them, the mixed material is melted, kneaded and extruded.

If desired, the resin composition of this invention may contain a wide variety of substances other than the above. Examples of said "other substances" which are added for particular purposes include other resins, flame retardant, stabilizer, plasticizer, lubricant, pigment, reinforcing fiber, filler, etc. Said "other resins" thermoplastic resins such as the above-mentioned polyolefin resins, the above-mentioned other thermoplastic resins, polyamides (nylon-6, nylon-66, nylon-12 and the like), polyamideimides, polyacrylic esters (polymethyl methacrylate and the like) and polyvinyl halides (polyvinyl chloride, polyvinylidene chloride and the like), and they are thermoplastic resins other than the thermoplastic resins constituting the thermoplastic resin (A) of this invention as members of it. The "other resin" used may be the same as the ingredient constituting the thermoplastic resin (A).

Examples of the flame retardant include phosphoric esters exemplified by triphenyl phosphate, tricresyl phosphate, a phosphate obtained from a mixture of isopropylphenol and phenol, a phosphate obtained from a mixture consisting of a bifunctional phenol such as benzohydroquinone or Bisphenol A and other alcohol or phenol, and the like; brominated compounds exemplified by decabromobiphenyl, pentabromotoluene, decabromodiphenyl ether, hexabromobenzene, brominated polystyrene, brominated epoxy resin and the like; nitrogen-containing compounds such as melamine, melamine triisocyanurate and the like; and inorganic substances such as red phosphorus, antimony trioxide, boron oxide and the like.

Concrete examples of the reinforcing fiber include inorganic fibers such as glass fiber, potassium titanate fiber, rock wool, carbon fiber and the like; organic fibers such as aromatic polyamide fiber, polybenzimidazole fiber and the like; and metallic fibers such as brass fiber, aluminum-zinc fiber and the like.

Concrete examples of the filler include inorganic fillers such as glass beads, milled glass fiber, asbestos, wallastnite, mica, talc, clay, calcium carbonate, magnesium hydroxide, silica, diatomaceous earth and the like, metallic fillers such as aluminum flake, zinc flake and the like; and organic fillers such as polyimide powder and the like.

As concrete examples of the stabilizer, sterically hindered phenols, organic phosphites, oxalic acid diazides, sterically hindered amines and the like can be referred to. As concrete examples of the pigment, titanium oxide, zinc sulfide and the like can be referred to. As concrete examples of the lubricant, polyethylene wax, paraffin and the like can be referred to.

The above-mentioned "other substances" may be used at any formulation in accordance with purpose. As a rough measure in its general use, however, said other resin is used in an amount of 500 parts by weight or less, said flame retardant is used in an amount of 30 parts by weight or less and preferably 1 to 20 parts by weight, said stabilizer is used in an amount of 20 parts by weight or less and preferably 0.001 to 10 parts by weight, said reinforcing fiber and filler are used both in an amount of 100 parts by weight or less and preferably 0.1 to 80 parts by weight, and said lubricant is used in an amount of 2 parts by weight or less, all per 100 parts by weight of thermoplastic resin (A).

Next, this invention will be illustrated in more detail with reference to examples. This invention is by no means limited by these examples.

In the examples, Izod impact strength (3.2 mm in thickness, notched), tensile properties and flexural properties were measured at 23° C. on test pieces prepared by injection molding according to ASTM D256, ASTM D638 and ASTM D790, respectively.

EXAMPLE 1

Mixture A was prepared by mixing by the use of Supermixer 100 parts by weight of a polypropylene (Sumitomo Noblen WF299B, manufactured by Sumitomo Chemical Co., Ltd., MFR 1.2 g/10 minutes), 2 parts by weight of maleic anhydride and 1 part by weight of a radical generator composition prepared by dispersing 1,3-bis-(t-butylperoxyisopropyl)-benzene into polypropylene up to a concentration of 8% by weight.

Mixture A was extruded by the use of a 50 mm twin screw kneading extruder (TEM-50, manufactured by Toshiba Machine Co., Ltd.) at a barrel temperature of 230° C., and the extruded strand was pelletized.

Then, 100 parts by weight of the pellet and 1 part by weight of 1,12-diaminododecane were mixed together, and the resulting mixture was extruded by the use of the above-mentioned twin screw kneading extruder at a barrel temperature of 230° C. The extruded strand was pelletized to obtain a resin composition of this invention.

The composition had a tensile elongation of 600%, a flexural modulus of 16,500 kg/cm$^2$ and an Izod impact strength of 5.2 kg·cm/cm.

COMPARATIVE EXAMPLE 1

A pelletized resin composition was prepared by repeating the procedure of Example 1, except that no 1,12-diaminododecane was used.

The resin composition had a flexural modulus of 15,800 kg/cm$^2$ and an Izod impact strength of 3.0 kg·cm/cm.

EXAMPLES 2-5 AND COMPARATIVE EXAMPLE 2

A pellet of Mixture A was prepared by mixing 85, 1 and 1 part(s) by weight, respectively, of the same polypropylene, maleic anhydride and radical generator composition as in Example 1 together with 15 parts by weight of ethylene-propylene copolymer rubber (Esprene E111P, manufactured by Sumitomo Chemical Co., Ltd.) and 2 parts by weight of styrene and extruding the mixture in the same manner as in Example 1.

Then, 100 parts by weight of the pellet and 1 part by weight of the diamino compound shown in Table 1 were mixed together and the resulting mixture was extruded by the use of the above-mentioned twin screw kneading extruder at a barrel temperature of 230° C. The extruded strand was pelletized to obtain a resin composition of this invention.

Tensile elongation, flexural modulus and Izod impact strength of the composition are shown in Table 1.

REFERENTIAL EXAMPLE 1

Eighty parts by weight of polypropylene (MFR 0.7 g/10 minutes, Sumitomo Noblen D501, manufactured by Sumitomo Chemical Co., Ltd.), 20 parts by weight of poly(2,6-dimethyl-1,4-phenylene ether) (PPE H-46, manufactured by Nippon Polyether Co., Ltd.), 1.6 parts by weight of maleic anhydride, 2 parts by weight of styrene and 1 part of the same radical generator composition as in Example 1 were mixed together by the use of Supermixer, and the resulting mixture was extruded by the same twin screw kneading extruder as in Example 1 at a barrel temperature of 260° C. The extruded strand was pelletized to obtain a pelletized composition. It was named preliminary kneaded product M-1.

EXAMPLE 6

One hundred parts by weight of the preliminary kneaded product M-1 obtained in Referential Example 1 was mixed with 1 part by weight of 1,12-diaminododecane and the resulting mixture was extruded by the use of the twin screw kneading extruder of Example 1 at a barrel temperature of 260° C. The extruded strand was pelletized to obtain a composition of this invention.

The composition had a tensile elongation, a flexural modulus and an Izod impact strength of 540%, 17,700 kg/cm$^2$ and 5.2 kg·cm/cm, respectively.

REFERENTIAL EXAMPLE 2

Fifty six parts by weight of polypropylene having an MFR of 1.2 g/10 minutes (Sumitomo Noblen WF299B, manufactured by Sumitomo Chemical Co., Ltd.), 24 parts by weight of poly(2,6-dimethyl-1,4-phenylene ether) having inherent viscosity of 0.40 dl/g (PPE H-40 manufactured by Nippon Polyether Co., Ltd.), 20 parts by weight of the same ethylene-propylene copolymer rubber as in Example 2, 1.4 parts by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 260° C. The extruded strand was pelletized to obtain a pelletized composition. It was named preliminary kneaded product M-2.

REFERENTIAL EXAMPLES 3-7

Seventy parts by weight of the same polypropylene as in Referential Example 2, 30 parts by weight of the same poly(2,6-dimethyl-1,4-phenylene ether) as in Referential Example 2, 2 parts by weight of styrene, 1 part by weight of the same radical generator composition as in Example 1 and the functional compound shown in Table 2 of which amount was varied as shown in Table 2 were mixed together by the use of Supermixer, and each of the resulting mixture was extruded by the use of the twin screw kneading extruder of Example 1 at a barrel temperature of 260° C. The extruded strand was pelletized to obtain a pelletized composition. The compositions thus obtained were named as shown in Table 2.

REFERENTIAL EXAMPLE 8

One hundred parts by weight of the same polypropylene as in Referential Example 2, 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 230° C. The extruded strand was pelletized to obtain a pelletized composition. It was named preliminary kneaded product M-8.

REFERENTIAL EXAMPLE 9

One hundred parts by weight of the same poly(2,6-dimethyl-1,4-phenylene ether) as in Referential Example 2, 1 part by weight of maleic anhydride and 1 part by weight of the same radical generator composition as in Example 1 were mixed together by the use of Supermixer, and the resulting mixture was extruded by the use of the twin screw kneading extruder of Example 1 at a barrel temperature of 300° C. The extruded strand was pelletized to obtain a pelletized composition. It was named preliminary kneaded product M-9.

EXAMPLES 7-17 AND COMPARATIVE EXAMPLES 3-4

One or two kind(s) of Preliminary kneaded product(s) obtained in Referential Examples 3-7, an elastomer and a polar compound, all shown in Table 3, were mixed together at the ratio shown in Table 3. Each of the resulting mixtures was extruded by the use of the twin screw kneading extruder of Example 1 at a barrel temperature of 260° C. The extruded strands were pelletized to obtain resin compositions of this invention.

Tensile elongations and Izod impact strengths of the resin compositions are shown in Table 3.

REFERENTIAL EXAMPLE 10

Seventy parts by weight of a block type propylene copolymer containing about 4% of ethylene component (Sumitomo Noblen AD571, manufactured by Sumitomo Chemical Co., Ltd.), 30 parts by weight of a crosslinked Chain type polyphenylene sulfide (T-4, manufactured by Toplen Co., Ltd.), 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 260° C. The extruded strand was pelletized to obtain a pelletized composition. It was named preliminary kneaded product M-10.

EXAMPLE 18

One hundred parts by weight of preliminary kneaded product M-10 obtained in Referential Example 10 was mixed with 1 part by weight of 1,12-diaminododecane, and the resulting mixture was extruded by the use of the twin screw kneading extruder of Example 1 at a barrel temperature of 240° C. The extruded strand was pelletized to obtain a resin composition of this invention.

Tensile elongation, flexural modulus and Izod impact strength of the composition were 250%, 15,400 kg/cm$^2$ and 10.2 kg·cm/cm, respectively.

COMPARATIVE EXAMPLE 5

A pelletized resin composition was prepared by repeating the procedure of Example 19, except that no 1,12-diaminododecane was used.

Tensile elongation, flexural modulus and Izod impact strength of the resin composition were 17%, 16,000 kg/cm$^2$ and 2.2 kg·cm/cm, respectively.

COMPARATIVE EXAMPLE 6

A pelletized resin composition was prepared by repeating the procedure of Example 19, except that the 1,12-diaminododecane was replaced with hexamethylenediamine.

Tensile elongation, flexural modulus and Izod impact strength of the resin composition were 150%, 14,800 kg/cm$^2$ and 8.0 kg·cm/cm, respectively.

REFERENTIAL EXAMPLE 11

Twenty parts by weight of the same polypropylene as in Example 1, 80 parts by weight of polystyrene (Esblite 8K, manufactured by Sumitomo Chemical Co., Ltd.), 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 220° C. The extruded strand was pelletized to obtain a pelletized composition. It was named preliminary kneaded product M-11.

REFERENTIAL EXAMPLE 12

Seventy parts by weight of the same polypropylene as in Example 1, 30 parts by weight of high-impact polystyrene (Esblite 500HM, manufactured by Sumitomo Chemical Co., Ltd.), 1 part by weight of maleic anhydride, 2 parts by weight of styrene and 1 part by weight of the same radical generator composition as in Example 11 to obtain a pelletized composition. It was named preliminary kneaded product M-12.

EXAMPLE 19

One hundred parts by weight of preliminary kneaded product M-11 and 1 part by weight of 1,12-diaminododecane were extruded by the use of the twin screw kneading extruder of Example 1 at 230° C. to obtain a resin composition of this invention.

Tensile elongation, flexural modulus and Izod impact strength of the composition were 9%, 24,800 kg/cm$^2$ and 3.5 kg·cm/cm, respectively.

COMPARATIVE EXAMPLE 7

A resin composition was prepared by repeating the procedure of Example 24, except that no 1,12-diaminododecane was used.

Tensile elongation, flexural modulus and izod impact strength of the composition were 3%, 24,000 kg/cm$^2$ and 0.8 kg·cm/cm, respectively.

EXAMPLE 20

A resin composition was prepared by repeating the procedure of Example 20, except that the preliminary kneaded product was altered to preliminary kneaded product M-12.

Tensile elongation, flexural modulus and Izod impact strength of the composition were 120%, 16,300 kg/cm$^2$ and 4.6 kg·cm/cm, respectively.

Owing to its excellent impact strength and economicity, the resin composition of this invention obtained in the above-mentioned manner can be formed by various forming processes such as extrusion, injection molding, blow molding and the like and furnished to the society as a variety of useful resin articles. Thus, this invention has a very high industrial value.

TABLE 1

| No. | Diamino compound | Tensile elongation (%) | Flexural modulus (kg/cm$^2$) | Izod impact strength (kg·cm/cm) |
|---|---|---|---|---|
| Example 2 | 1,12-Diamino-dodecane | 720 | 12,500 | 68 |
| Example 3 | 1,10-Diamino-dodecane | 650 | 12,500 | 65 |
| Example 4 | 1,9-Diamino-nonane | 620 | 12,300 | 65 |
| Example 5 | 1,8-Diamino-octane | 630 | 12,000 | 61 |
| Comparative Example 2 | — | 620 | 11,700 | 39 |

TABLE 2

| No. | Preliminary kneaded product | Functional compound Name | Parts by wt. |
|---|---|---|---|
| Referential Example 3 | M-3 | Maleic anhydride | 1.2 |
| Referential Example 4 | M-4 | Hymic anhydride | 1.5 |
| Referential Example 5 | M-5 | Fumaric acid | " |
| Referential Example 6 | M-6 | Citric acid | " |
| Referential Example 7 | M-7 | Malic acid | " |

TABLE 3

| No. | Preliminary kneaded product A Name | Parts by wt. | Preliminary kneaded product B Name | Parts by wt. | Elastomer Name | Parts by wt. |
|---|---|---|---|---|---|---|
| Example 7 | M-2 | 100 | — | — | — | — |
| Example 8 | " | " | — | — | — | — |
| Example 9 | " | " | — | — | — | — |
| Example 10 | M-3 | 80 | — | — | EPR$^{b)}$ | 20 |
| Example 11 | " | " | — | — | SEP$^{c)}$ | " |
| Example 12 | " | " | — | — | SEBS$^{d)}$ | " |
| Example 13 | M-4 | " | — | — | EPR | " |
| Example 14 | M-5 | " | — | — | " | " |
| Example 15 | M-6 | " | — | — | " | " |
| Example 16 | M-7 | " | — | — | " | " |
| Example 17 | M-8 | 56 | M-9 | 24 | " | " |
| Comparative Example 3 | " | " | " | " | " | " |
| Comparative Example 4 | M-2 | 100 | — | — | — | — |

| Diamino compound Name | Parts by wt. | Tensile elongation (%) | Izod impact strength (kg·cm/cm) |
|---|---|---|---|
| 1,12-Daimino-dodecane | 0.95 | 340 | 33 |
| 1,8-Diamino-octane | " | 280 | 29 |
| Diamine S$^{a)}$ | 1.5 | 140 | 22 |
| 1,12-Diamino-dodecane | 0.95 | 310 | 39 |
| 1,12-Diamino-dodecane | " | 95 | 30 |
| 1,12-Diamino-dodecane | " | 380 | 30 |
| 1,12-Diamino-dodecane | " | 300 | 36 |
| 1,12-Diamino-dodecane | " | 250 | 29 |
| 1,12-Diamino-dodecane | " | 170 | 28 |
| 1,12-Diamino-dodecane | " | 140 | 28 |
| 1,12-Diamino-dodecane | " | 110 | 15 |
| Hexamethylene-diamine | " | 85 | 7.3 |
| — | — | 52 | 5.6 |

Notes)
$^{a)}$Structure formula: $H_2N-CH_2CH(CH_3)-(OCH_2CH(CH_3))_{\overline{5.6}}-NH_2$
$^{b)}$Ethylene-propylene copolymer rubber (Esprene E111P, manufactured by Sumitomo Chemical Co., Ltd.)
$^{c)}$Partially hydrogenated styrene-isoprene block copolymer rubber (Kraton G-1701, manufactured by Shell Chemical Co., Ltd.)
$^{d)}$Partially hydrogenated styrene-butadiene-styrene block copolymer rubber (Kraton G-1650, manufactured by Shell Chemical Co., Ltd.)

We claim:
1. A resin composition comprising
(A) a thermoplastic resin or resin mixture comprising a polyolefin resin alone or in admixture with at least one member selected from the group consisting of another thermoplastic resin and an elastomer,
(B) a functional compound having one or more bonds or one or more functional groups selected from the group consisting of non-aromatic carbon-carbon multiple bonds, oxirane groups and substituted carboxyl groups selected from the group consisting of $-COOR_1$, $-COX$, $-CONR_2R_3$ and $-CO-Y-CO-$, wherein $R_1$ represents hydrogen or an alkyl or aryl having 1-20 carbon atoms optionally having one or more inactive substituents, X represents halogen, $R_2$ and $R_3$ each represents hydrogen or an alkyl or aryl having 1-10 carbon atoms optionally having one or more inactive substituents, and Y represents oxygen or NH, and

(C) a diamino compound represented by the formula:

$$R^I\text{NH}—X—\text{NHR}^{II}$$

wherein $R^I$ and $R^{II}$ each represents hydrogen or alkyl optionally having one or more inactive substituents, and X represents an alkylene group having 7 to 30 carbon atoms and optionally one or more inactive substituents, wherein the inactive substituents are selected from the group consisting of aryl, halogen, cyano, nitro, carbonyl, sulfonyl, ether, sulfide, ester and amido.

2. A resin composition according to claim 1, wherein said thermoplastic resin (A) is a polyolefin resin.

3. A resin composition according to claim 1, wherein said diamino compound is a diamino compound represented by the formula:

$$\text{NH}_2—X—\text{NH}_2$$

wherein X represents a straight chain alkylene group having 8 to 20 carbon atoms.

4. A resin composition according to claim 1, wherein said functional compound is a functional compound simultaneously having (i) at least one bond or functional group selected from the group consisting of non-aromatic carbon-carbon multiple bonds, oxirane groups and substituted carboxyl groups selected from the group consisting of —COOR$_1$, —COX, —CONR$_2$R$_3$ and —CO—Y—CO—, wherein R$_1$ represents hydrogen or an alkyl or aryl having 1-20 carbon atoms optionally having one or more inactive substituents, X represents halogen, R$_2$ and R$_3$ each represents hydrogen or an alkyl or aryl having 1-10 carbon atoms optionally having one or more inactive substituents, and Y represents oxygen or NH, and (ii) at least one functional group selected from the group consisting of substituted carboxyl groups selected from the group consisting of —COOR$_1$, —COX, —CONR$_2$R$_3$ and —CO—Y—CO—, wherein R$_1$ represents hydrogen or an alkyl or aryl having 1-20 carbon atoms optionally having one or more inactive substituents, X represents halogen, R$_2$ and R$_3$ each represents hydrogen or an alkyl or aryl having 1-10 carbon atoms optionally having one or more inactive substituents, and Y represents oxygen or NH, substituted hydroxyl groups selected from the group consisting of —OR$_4$, $$—\text{OCR}_5^{\;\;\;O}_{\;\;\;\|},$$

and —OSi(R)$_6$)$_3$, wherein R$_4$ and R$_5$ each represent hydrogen or an alkyl or aryl having 1-10 carbon atoms optionally having one or more inactive substituents, and the three R$_6$s each represent identical or different alkyl, aryl or alkoxy having 1-10 carbon atoms optionally having one or more inactive substituents, substituted amino groups selected from the group consisting of —NHR$_7$ and $$—\text{NHCR}_8^{\;\;\;O}_{\;\;\;\|},$$

wherein R$_7$ represents hydrogen, cyano or an alkyl or aryl having 1-10 carbon atoms optionally having one or more inactive substituents, and R$_8$ represents hydrogen or an alkyl or aryl having 1-20 carbon atoms optionally having one or more inactive substituents, substituted silyl groups of the formula —Si(R$_9$)$_3$, wherein the three R$_9$s each represent hydrogen or identical or different alkyl, aryl or alkoxy having 1-10 carbon atoms optionally having one or more amino or mercapto, substituted mercapto groups selected from the group consisting of —SR$_{10}$ and $$—\text{SCR}_{11}^{\;\;\;O}_{\;\;\;\|},$$

wherein R$_{10}$ and R$_{11}$ each represents hydrogen or an alkyl or aryl having 1-10 carbon atoms optionally having one or more inactive groups, substituted sulfonic acid groups selected from the group consisting of —SO$_3$R$_{12}$, —SO$_2$X and —SO$_2$NR$_{13}$R$_{14}$, wherein R$_{12}$ represents hydrogen or an alkyl or aryl having 1-20 carbon atoms optionally having one or more inactive substituents, X represents halogen, and R$_{13}$ and R$_{14}$ each represent hydrogen or an alkyl or aryl having 1-10 carbon atoms optionally having one or more inactive substituents and oxirane groups, wherein the inactive substituents are selected from the group consisting of aryl, halogen, cyano, nitro, carbonyl, sulfonyl, ether, sulfide, ester and amido, provided that the functional group of (ii) is different from the functional group of (i).

5. A resin composition according to claim 1, wherein said thermoplastic resin is a resin mixture consisting of a polyolefin resin and another thermoplastic resin.

6. A resin composition according to claim 1, wherein said thermoplastic resin is a resin mixture consisting of a polyolefin resin, another thermoplastic resin and an elastomer.

7. A resin composition according to claim 5, wherein said other thermoplastic resin is a polyphenylene ether resin.

8. A resin composition according to claim 5, wherein said other thermoplastic resin is a styrene resin.

9. A resin composition according to claim 5, wherein said other thermoplastic resin is a polyarylene sulfide resin.

10. A resin composition according to claim 1, wherein said diamino compound (C) is 1,12-diaminododecane.

11. A process for producing a resin composition which comprises melting and kneading (A) a thermoplastic resin which is a polyolefin resin together with (B) a functional compound having one or more bonds or one or more functional groups selected from the group consisting of non-aromatic carbon-carbon multiple bonds, oxirane groups and substituted carboxyl groups selected from the group consisting of —COOR$_1$, —COX, —CONR$_2$R$_3$ and —CO—Y—CO—, wherein R$_1$ represents hydrogen or an alkyl or aryl having 1-20 carbon atoms optionally having one or more inactive substituents, X represents halogen, R$_2$ and R$_3$ each represents hydrogen or an alkyl or aryl having 1-10 carbon atoms optionally having one or more inactive substituents, and Y represents oxygen or NH, and subsequently mixing thereinto (C) a diamino compound represented by the following general formula:

$$R^I NH-X-NHR^{II}$$

wherein R$^I$ and R$^{II}$ each represents hydrogen or alkyl optionally having one or more inactive substituents and X represents an alkylene group having 7 to 30 carbon atoms and optionally having one or more inactive substituents wherein the inactive substituents are selected from the group consisting of aryl, halogen, cyano, nitro, carbonyl, sulfonyl, either, sulfide, ester and amido.

12. A process for producing a resin composition according to claim 11, wherein said functional compound is a functional compound simultaneously having (i) at least one bond or functional group selected from the group consisting of non-aromatic carbon-carbon multiple bonds, oxirane groups and substituted carboxyl groups selected from the group consisting of —COOR$_1$, —COX, —CONR$_2$R$_3$ and —CO—Y—CO—, wherein R$_1$ represents hydrogen or an alkyl or aryl having 1-20 carbon atoms optionally having one or more inactive substituents, X represents halogen, R$_2$ and R$_3$ each represents hydrogen or an alkyl or aryl having 1-10 carbon atoms optionally having one or more inactive substituents, and Y represents oxygen or NH, and (ii) at least one functional group selected from the group consisting of substituted carboxyl groups selected from the group consisting of —COOR$_1$, —COX, —CONR$_2$R$_3$ and —CO—Y—, wherein R$_1$ represents hydrogen or an alkyl or aryl having 1-20 carbon atoms optionally having one or more inactive substituents, X represents halogen, R$_2$ and R$_3$ each represents hydrogen or an alkyl or aryl having 1-10 carbon atoms optionally having one or more inactive substituents, and Y represents oxygen or NH, substituted hydroxyl groups selected from the group consisting of —OR$_4$, $$-\overset{O}{\underset{\|}{O}}CR_5,$$

and —OSi(R$_6$)$_3$, wherein R$_4$ and R$_5$ each represent hydrogen or an alkyl or aryl having 1-10 carbon atoms optionally having one or more inactive substituents, and the three R$_6$s each represent identical or different alkyl, aryl or alkoxy having 1-10 carbon atoms optionally having one or more inactive substituents, substituted amino groups selected from the group consisting of —NHR$_7$ and $$-\overset{O}{\underset{\|}{N}}HCR_8,$$

wherein R$_7$ represents hydrogen, cyano or an alkyl or aryl having 1-10 carbon atoms optionally having one or more inactive substituents, and R$_8$ represents hydrogen or an alkyl or aryl having 1-20 carbon atoms optionally having one or more inactive substituents, substituted silyl groups of the formula —Si(R$_9$)$_3$, wherein the three R$_9$s each represent hydrogen or identical or different alkyl, aryl or alkoxy having 1-10 carbon atoms optionally having one or more amino or mercapto, substituted mercapto groups selected from the group consisting of —SR$_{10}$ and $$-\overset{O}{\underset{\|}{S}}CR_{11},$$

wherein R$_{10}$ and R$_{11}$ each represents hydrogen or an alkyl or aryl having 1-10 carbon atoms optionally having one or more inactive groups, substituted sulfonic acid groups selected from the group consisting of —SO$_3$R$_{12}$, —SO$_2$X and —SO$_2$NR$_{13}$R$_{14}$, wherein R$_{12}$ represents hydrogen or an alkyl or aryl having 1-20 carbon atoms optionally having one or more inactive substituents, X represents halogen, and R$_{13}$ and R$_{14}$ each represent hydrogen or an alkyl or aryl having 1-10 carbon atoms optionally having one or more inactive substituents and oxirane groups, wherein the inactive substituents are selected from the group consisting of aryl, halogen, cyano, nitro, carbonyl, sulfonyl, ether, sulfide, ester and amido, provided that the functional group of (ii) is different from the functional group of (i).

13. A process for producing a resin composition according to claim 11, wherein said thermoplastic resin (A) is a resin mixture consisting of a polyolefin resin and another thermoplastic resin.

14. A process for producing a resin composition according to claim 11, wherein said thermoplastic resin (A) is a resin mixture consisting of a polyolefin resin, another thermoplastic resin and an elastomer.

15. A resin composition according to claim 6, wherein said other thermoplastic resin is a polyphenylene ether resin.

16. A resin composition according to claim 6, wherein said other thermoplastic resin is a styrene resin.

17. A resin composition according to claim 6, wherein said other thermoplastic resin is a polyarylene sulfide resin.

* * * * *